Patented May 17, 1938

2,117,860

UNITED STATES PATENT OFFICE 2,117,860

COLORED RUBBER PRODUCTS

Alfred Siegel, Roselle, N. J., assignor to E. I. du Pont de Nemours & Company, Wilmington, Del., a corporation of Delaware No Drawing. Application January 9, 1936, Serial No. 58,418

9 Claims. (Cl. 18—50)

The present invention relates to rubber products colored with the lakes of the azo dyestuff obtained by coupling diazotized 2.chlor-4.amino-1.toluene-5.sulfonic acid with 2.naphthol-3.carboxylic acid. This azo compound may also be called 2.chlor-1.methyl-5.sulfo-4.azo-2.hydroxynaphthalene-3.carboxylic acid.

The lakes derived from this azo dyestuff which are useful in my invention are the alkaline earth metal and heavy metal salts of the dyestuff and the insoluble products obtained by "laking" the dyestuff or its salts with the common lake substrata such as barytes, alumina hydrate, whiting, blanc fixe and others.

These lakes can be used according to my invention for the coloring of rubber products, namely, natural, as well as synthetic caoutchoucs, and such plastic products as are derived from the rubber hydrocarbon or similar hydrocarbon products. As a general group these products can be considered to be plastics belonging to the rubber family. They include, beside the natural product, the polymerization products of substituted and unsubstituted butadienes-1:3, including the polymerization products of chloroprene, the vulcanization products of such caoutchoucs, the rubber hydrochlorides, chlorinated rubbers, and the thermo-plastic, isomerized derivatives of rubber made by treating rubber with so-called isomerizing agents such as tin chloride, aryl sulfonic acids, etc.

In the exercise of my invention I incorporate the desired amount of lake into the rubber product by any well-known means for incorporating a pigment or other compounding ingredient into a rubber product. I thereby obtain a colored crude rubber product, which has various possible commercial uses.

Similarly I can mix my lakes with latex and use the mixture for such purposes where a colored rubber product made from latex is desired.

When desired the rubber products into which my lakes have been incorporated can be vulcanized in well-known manners.

The unvulcanized, as well as the vulcanized rubber products containing the lakes of diazotized 2.chlor-4.amino-1.toluene-5.sulfonic acid coupled with 2.naphthol-3.carboxylic acid, are yellowish to bluish red in shade, the color is very brilliant and exceedingly fast to light and crocking. The latter term means rubbing off of color from a dry heat or air vulcanized, colored rubber coated fabric coated with a varnish composed of shellac, soap, and ammonium hydroxide.

The brilliancy and light fastness of my novel colored rubber products are far superior to those of rubber products colored to similar shades with other azo dyes.

The property of my lakes which make them particularly adapted for use in coloring rubber products is their great resistance to the conditions of vulcanization and insolubility in rubber solvents, and they favorably distinguish in this respect from many of the other azo dyes or lakes of the colors and shades of these lakes.

The following will exemplify my invention:

Example I

A rubber composition was prepared by milling together in the conventional manner between steel rolls:

| | Parts by weight |
|---|---|
| Pale crepe rubber | 100.00 |
| Zinc oxide | 5.00 |
| Blanc fixe | 37.95 |
| Lithopone | 15.00 |
| Accelerator | 1.00 |
| Sulfur | 1.75 |
| Calcium lake of diazotized 2.chlor-4.amino-1.toluene-5.sulfonic acid combined with 2.naphthol-3.carboxylic acid | 1.00 |

A crude rubber composition of a bright bluish red color was obtained.

This was vulcanized for 40 minutes at 40 pounds steam pressure.

The so-obtained vulcanized rubber product had a bright bluish red color which is not affected deleteriously by storage, light, or exposure to the elements.

Example II

This example refers to the coloring of a rubber product derived from polymerized chloroprene, known under the registered trade-mark "DuPrene".

A rubber composition was prepared by milling together in the conventional manner between steel rolls:

| | Parts by weight |
|---|---|
| "DuPrene" | 100.00 |
| Light calcined magnesia | 10.00 |
| F. F. wood rosin | 5.00 |
| Zinc oxide | 10.00 |
| Lithopone | 50.00 |
| $TiO_2$ | 10.00 |
| Sulfur | 1.00 |
| Calcium lake of 2.chlor-1.methyl-5.sulfo-4.azo-2.hydroxynaphthalene-3.carboxylic acid | 2.00 |

The sheeted mixture was cured in a platen press for 20 minutes at 60 lbs. steam pressure. A bluish red vulcanized rubber was obtained which was darker and somewhat duller than the vulcanized natural rubber obtained in Example I.

Example III

A rubber composition was prepared by milling together the following:

| | Parts by weight |
|---|---|
| Synthetic butadiene rubber | 100.00 |
| Lithopone | 30.00 |
| Stearic acid | 2.00 |
| Zinc oxide | 50.00 |
| Sulfur | 2.50 |
| Accelerator | 1.00 |
| Calcium lake of diazotized 2.chlor-4.amino toluene-5.sulfonic acid combined with 2.naphthol-3.carboxylic acid extended with alumina hydrate | 2.00 |

The sheeted mixture was vulcanized for 10 minutes in a platen press at 60 lbs. steam pressure. A bluish red, elastic vulcanizate was obtained.

Example IV

33½ grams of chlorinated rubber known under the trade-mark "Tornesit" were dissolved in 60 grams of solvent naphtha by stirring. One gram of calcium lake of diazotized 2.chlor-4.amino toluene-5.sulfonic acid combined with 2.naphthol-3.carboxylic acid extended with alumina hydrate was stirred into 7 grams of solvent naphtha to make a paste which was then stirred into the solution of the chlorinated rubber. This was stirred thoroughly and poured out on a flat surface where it dried, leaving a film of colored "Tornesit" which could be used for the same purposes as the commercial material.

Example V

Three grams of the calcium lake of diazotized 2.chlor-4.amino toluene-5.sulfonic acid combined with 2.naphthol-3.carboxylic acid extended with alumina hydrate were milled in a roller mill into 100 grams of rubber hydrochloride. This produced in benzol a red solution which can be incorporated into various plastic materials to produce red colored products.

Example VI

A thermo-plastic rubber known under the trade-mark "Plioform" was softened on the roller mill at a temperature of 70° C. 2% of the calcium lake of diazotized 2.chlor-4.amino toluene-5.sulfonic acid combined with 2.naphthol-3.carboxylic acid extended with alumina hydrate was worked into "Plioform" on the mill until a deep red homogeneous mixture was obtained. This material was plastic when hot, and hard and brittle when cold. By dissolving this in benzol solutions of varying viscosity and solids content, a deep red color was obtained. This red colored plastic was used for molding various articles.

When using the barium or strontium or mixed lakes of this dyestuff, I obtain yellower products than with the calcium lake, but the fastness properties are substantially the same.

Other lakes, such as the zinc, magnesium, cadmium, nickel, cobalt, etc., lake of this dyestuff, as well as the lakes precipitated on substrata, such as alumina hydrate, blanc fixe, etc., produce rubber products of similar shades and fastness properties.

I claim:

1. A light-fast colored rubber product containing as a coloring ingredient a lake of the azo dyestuff obtained by coupling diazotized 2.chlor-4.amino-1.toluene-5.sulfonic acid with 2.naphthol-3.carboxylic acid, said coloring ingredient being stable and resistant to vulcanizing conditions.

2. A vulcanized light-fast colored rubber product containing as a coloring ingredient a lake of the azo dyestuff obtained by coupling diazotized 2.chlor-4.amino-1.toluene-5.sulfonic acid with 2.naphthol-3.carboxylic acid.

3. A vulcanized, light-fast colored, natural caoutchouc product containing as a coloring ingredient a lake of the azo dyestuff obtained by coupling diazotized 2.chlor-4.amino-1.toluene-5.sulfonic acid with 2.naphthol-3.carboxylic acid.

4. The product of claim 2 in which said lake is a calcium lake.

5. The product of claim 2 in which said lake is a barium lake.

6. The product of claim 2 in which said lake is a strontium lake.

7. The product of claim 2 in which said rubber product is a polymerized chloroprene.

8. A light-fast colored rubber product containing as a coloring ingredient a lake comprising the metallic salt of the azo dyestuff obtained by coupling diazotized 2.chlor-4-amino-1.toluene-5.sulfonic acid with 2.naphthol-3.carboxylic acid, said coloring ingredient being stable and resistant toward vulcanizing conditions.

9. A light-fast colored rubber product containing as a coloring ingredient an azo dyestuff lake precipitated on an inorganic substratum, said dyestuffs being obtained by coupling diazotized 2.chlor-4.amino-1.toluene-5.sulfonic acid with 2.naphthol-3.carboxylic acid, said coloring ingredient being stable and resistant toward vulcanizing conditions.

ALFRED SIEGEL.